United States Patent [19]

Nardella

[11] Patent Number: 4,692,100
[45] Date of Patent: Sep. 8, 1987

[54] VACUUM BLADE FOR A HOLLOW TYPE FAN AND PROCESS

[75] Inventor: Massimiliano Nardella, Milan, Italy
[73] Assignee: F.B.M. Hudon Italiana S.p.A., Italy
[21] Appl. No.: 706,266
[22] Filed: Feb. 27, 1985
[30] Foreign Application Priority Data

Feb. 29, 1984 [IT] Italy .............................. 19856 A/84

[51] Int. Cl.$^4$ ............................................ F04D 29/38
[52] U.S. Cl. ..................................... 416/232; 416/84; 415/119
[58] Field of Search ................. 416/232, 500, 226, 84, 416/61; 415/119; 29/156.8 H

[56] References Cited

U.S. PATENT DOCUMENTS 2,405,022  7/1946  Enos ................................. 416/232
2,652,121  9/1953  Kearns, Jr. et al. ................ 416/226
3,667,862  6/1972  Parr .................................... 416/226

FOREIGN PATENT DOCUMENTS 2443726  3/1976  Fed. Rep. of Germany .
535480   4/1922  France ................................. 416/84
896389   2/1945  France ................................ 416/232
407340   9/1944  Italy .................................... 416/232
7302368  8/1974  Netherlands .
1323383  7/1973  United Kingdom .

Primary Examiner—Robert E. Garrett
Assistant Examiner—John Kwon
Attorney, Agent, or Firm—Bacon & Thomas

[57] ABSTRACT

The interior of a hollow propeller blade is placed under vacuum for enhancing rigidity of the blade and reducing noise production during its rotation.

3 Claims, 3 Drawing Figures

VACUUM BLADE FOR A HOLLOW TYPE FAN AND PROCESS

The invention refers to the field of fans.

At present fans with large blades are used for large air-flows, generally in industry. The blades of these fans are usually made hollow so that they are quite rigid and light. Said hollow blades are fitted onto a fan hub according to any known method. In many cases the inside of each blade still communicates with the outside by means of a small hole made in the radially outermost end of the blade.

These fans can range in diameter from 2 meters up to 20 meters.

One drawback with known fans is noise. In order to partially prevent said noise, which increases with the revolutions per minute, it is generally preferred to increase the number of blades in the fan and reduce the rotating speed thereof, also by the use of multipolar electric motors. However, this involves the drawback of increased cost of the fan, though bringing the noise problem within the prescribed limits.

The present invention originates from the consideration that a source of noise, like an industrial axial flow fan, generates noise at a determined number of revs per minute and for a determined inclination of the blades. An important factor contributing to the noise is the material used in making the blades and that the latter are normally hollow. The noise levels, at different frequency bands, are a function of different factors, among which the natural or specific frequency resulting from the blade's construction and the "resonance box" effect of said blade or blade beat, also known as "popping".

The natural frequency of the blade is a function of its slenderness (or rigidity). For mechanical stability the rotational frequency of the blade (that is, the revs per second made by the fan) and the blade's natural frequency must not coincide or be similar, that is, the blade must not resonate. Resonance is quite frequent and leads to both mechanical instability of the blade and a contribution to the noise volume developed from rotation, said contribution being due to the higher harmonics which are multiple of the natural one.

Several attempts have been made to stiffen the blade. The attempt to fill the cavity in the blade with soundproofing materials (polystyrene, glass wool, etc.) did not lead to any notable results.

In addition, when rotating the blade must develop, together with the other fan blades, some head, for which the fan has been designed. This involves the fan being subjected to pressures which vary from point to point. These variable pressures create the "popping" effect and, aided by the stagnant air in the cavity of the blades, the noise generated is transmitted and amplified over the whole surface of the blade.

An object of the present invention is to reduce the noise.

Another object is to increase the rigidity of the blades.

The novel solution which has been found for the above mentioned problems provides a blade for the so-called hollow type of fan, that is, a blade comprising a shell enclosing an inner space, characterized in that said shell is made airtight and the inner space contains a vacuum, preferably a high vacuum. According to the invention a process of constructing a fan with hollow blades is also provided, characterized in that it comprises the stage of making said blades basically airproof and creating a degree of vacuum, preferably a high vacuum, therein.

The system for extracting the air from the blade cavity may be system currently used for other purposes (ejector, liquid ring vacuum pump, etc.).

The invention gives the following results: the blade, with the air removed, becomes more rigid due to the difference in pressure between the external atmospheric pressure of 1.033 $kg/cm^2$ and the inner vacuum, the increased rigidity being evenly spread over the whole surface of the blade. The relative natural frequency of the blade is therefore correspondingly increased, which improves the mechanical stability of said blade. The increased natural frequency of the blade leads to a reduction in the higher multiple harmonics and, therefore, also in those harmonics which occur at frequencies which may be painful to the human ear (250÷1500 Hz).

The substantial absence of air inside the blade eliminates the element conducting the local noise disturbance, generated by the blade "popping".

For fixed noise levels at different frequency bands it is now possible to use hollow blades with internal vacuum at a higher number of revs than normal, which provides the economic benefit of a smaller number of blades per fan. Using blades with a high vacuum it is possible to avoid increasing the number of blades and the use of multipolar electric motors, in order to obtain the prescribed noise level.

The present invention will be described in detail with reference to the accompanying drawings, in which.

Figure 1:
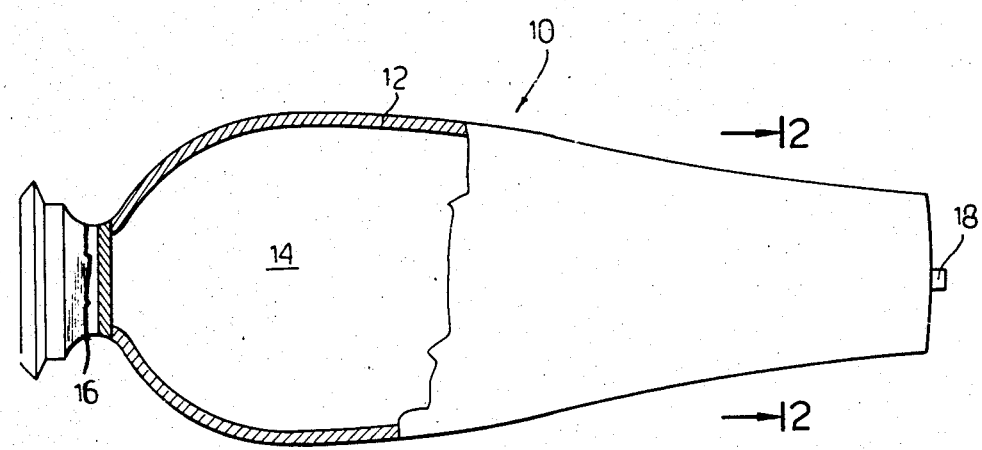
FIG. 1 is a partially broken view of a hollow blade showing the inside thereof, according to the invention.
Figure 2:
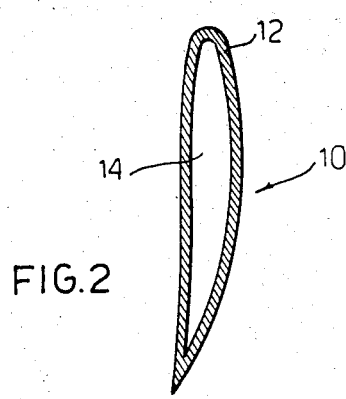
FIG. 2 is a section view along line 2—2 of the blade in FIG. 1.
Figure 3:
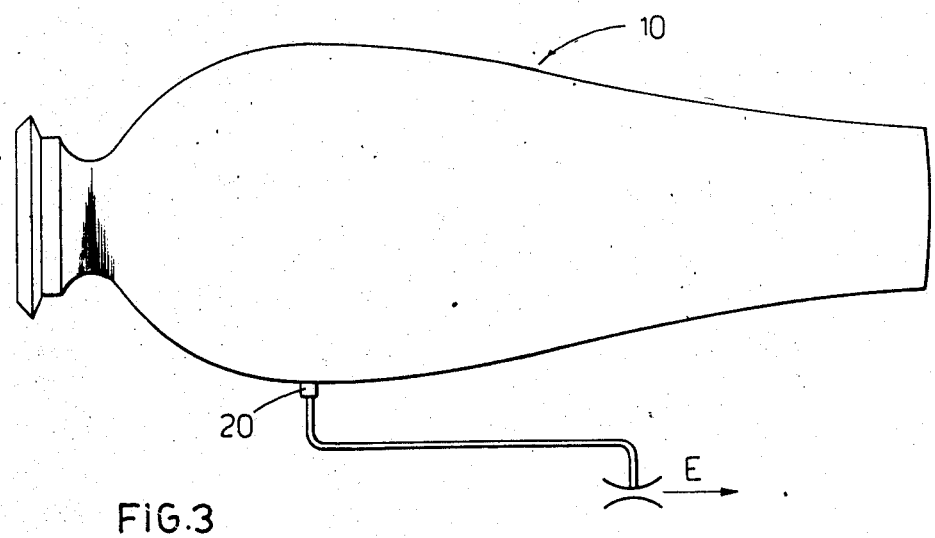
FIG. 3 shows schematically a method for creating the vacuum inside the blade.

In the figures is shown a type of blade, indicated globally by 10, for a fan. Said blade 10 is hollow, that is, it has a wall or shell 12 which is airproof and an internal space 14, according to the present invention.

The wall 12 may be made of any kind of material by means of any method used at present in this field; for example, it may be made of cloth reinforced resin, extruded aluminium, etc.

At one end the blade has a flanged neck 16 of the normal type for attaching to a fan hub, not shown.

According to the present invention the inside of the neck 16 is sealed airtight, using any method within the capability of a technician in this field, and a degree of vacuum, possibly a high vacuum, is created inside space 14.

For creating the vacuum a hole 18 can be used, normally located at the distal end of the blade, or a special opening 20 can be made. The vacuum can be created by any method known to a technician in this field, for example, by connecting the opening or hole to an ejector E, to a vacuum pump or similar. The opening or hole is then sealed.

In the case of blades with several hollow sections, as for example those made in extruded aluminium, each section, separate from the others, must have a vacuum created therein or the vacuum may be created in the blade at one go, after having made the openings or holes so that said separate sections are intercommunicating.

All the variations within the capability of a technician in this field may be made to what has been described above, without falling beyond the scope of this patent application.

What I claim is:

1. An improved propeller blade for an industrial fan, the blade having enhanced rigidity and reduced noise production during rotation comprising an airtight hollow shell in the configuration of a blade, the interior of substantially the entire shell defining an inner space, and the inner space being in a vacuum condition.

2. The blade of claim 1 wherein the inner space is under a high vacuum.

3. The blade of claim 1 wherein substantially the entire inner space is in a vacuum condition with respect to external atmospheric pressure.

* * * * *

UNITED STATES PATENT AND TRADEMARK OFFICE
CERTIFICATE OF CORRECTION

PATENT NO. : 4,692,100

DATED : September 8, 1987

INVENTOR(S) : NARDELLA, Massimiliano

It is certified that error appears in the above—identified patent and that said Letters Patent is hereby corrected as shown below:

Title page:

-- Assignee: F.B.M. Hudson Italiana S.p.A., Italy --.

Signed and Sealed this

Twenty-third Day of February, 1988

Attest:

DONALD J. QUIGG

Attesting Officer

Commissioner of Patents and Trademarks